United States Patent
Arai et al.

(10) Patent No.: US 7,289,284 B2
(45) Date of Patent: Oct. 30, 2007

(54) STRAY FIELD DETECTOR, MAGNETIC DISK DRIVE, AND METHOD OF HEAD ESCAPING

(75) Inventors: Reiko Arai, Kanagawa (JP); Takehiko Hamaguchi, Kanagawa (JP); Atsushi Kikugawa, Tokyo (JP); Hideaki Maeda, Kanagawa (JP); Liping Shen, Kanagawa (JP); Mikio Suzuki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 127 days.

(21) Appl. No.: 11/195,202

(22) Filed: Aug. 1, 2005

(65) Prior Publication Data

US 2006/0028747 A1 Feb. 9, 2006

(30) Foreign Application Priority Data

Aug. 3, 2004 (JP) .............................. 2004-226319

(51) Int. Cl.
*G11B 5/02* (2006.01)
(52) U.S. Cl. .............................. 360/25; 360/46; 360/75
(58) Field of Classification Search ..................... None
See application file for complete search history.

(56) References Cited

U.S. PATENT DOCUMENTS

| 6,111,715 | A | * | 8/2000 | Tsuchiya et al. ............... 360/66 |
| 7,009,792 | B2 | * | 3/2006 | Sakai et al. ................... 360/39 |
| 2003/0107831 | A1 | * | 6/2003 | Erden et al. .................. 360/31 |

FOREIGN PATENT DOCUMENTS

| JP | 05-225526 A | 9/1993 |
| JP | 07-225901 A | 8/1995 |
| JP | 2002-100141 A | 4/2002 |
| JP | 2003-272331 A | 9/2003 |

* cited by examiner

*Primary Examiner*—Andrea Wellington
*Assistant Examiner*—Dan I Davidson
(74) *Attorney, Agent, or Firm*—Townsend and Townsend and Crew LLP; Matthew Zieses

(57) ABSTRACT

Embodiments of the invention prevent demagnetization or degaussing of recorded magnetizations, even if a stray field is applied. In one embodiment, an output of a read head including a magneto-resistive effect element is inputted to a stray field detector through a DC amplifier and a DC filter. The stray field detector monitors dc components of the output from the read head, and escapes a head from above a magnetic recording medium.

23 Claims, 12 Drawing Sheets

Fig. 1 4 (PRIOR ART)

Conventional technology

Fig. 1 5 (PRIOR ART)
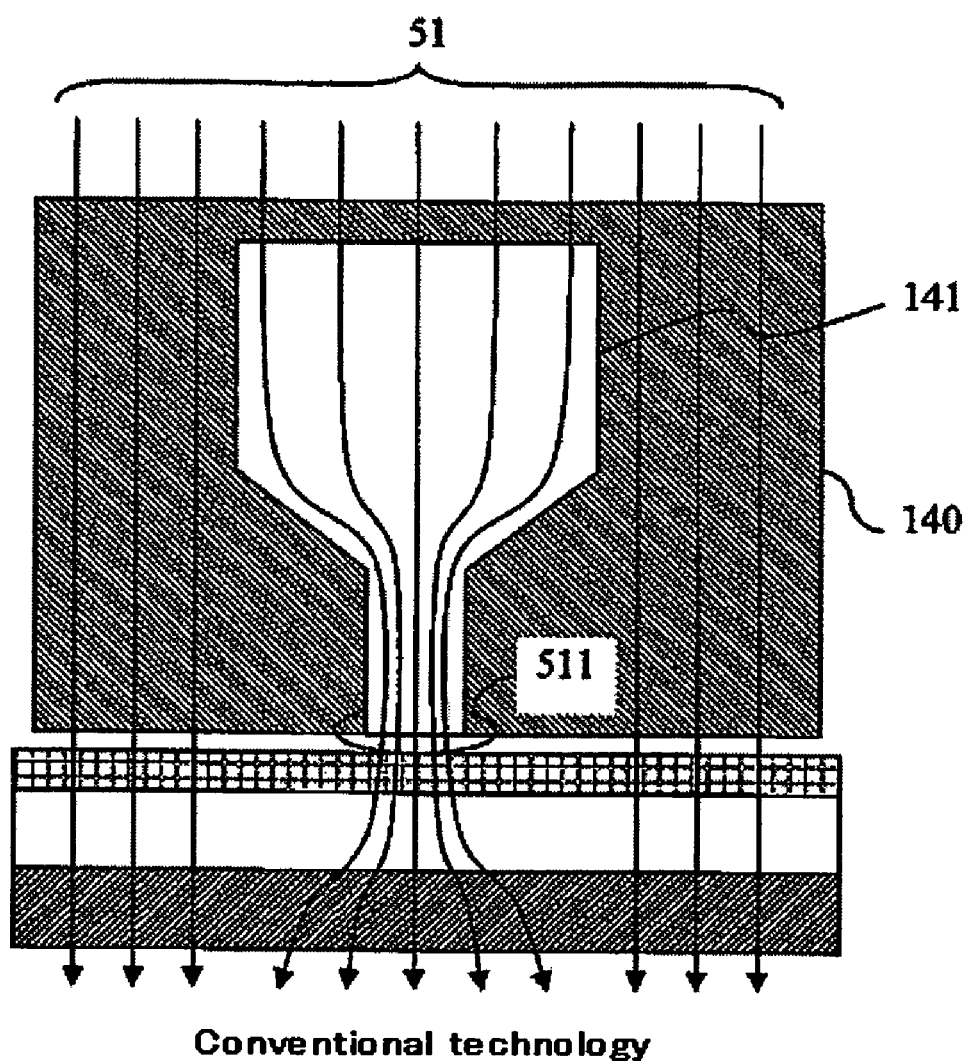
Conventional technology

STRAY FIELD DETECTOR, MAGNETIC DISK DRIVE, AND METHOD OF HEAD ESCAPING

CROSS-REFERENCES TO RELATED APPLICATIONS

This application claims priority from Japanese Patent Application No. JP2004-226319, filed Aug. 3, 2004, the entire disclosure of which is incorporated herein by reference.

BACKGROUND OF THE INVENTION

The present invention relates to a stray field detecting method, a stray field detector, and a stray-field-resistant magnetic disk drive in the data read/write device that magnetically reads a signal written in the thickness direction of a recording medium.

The conventional recording technique will be described with a perpendicular magnetic disk drive as an example referring to FIG. 14 and FIG. 15. The perpendicular magnetic disk drive is a magnetic disk drive that possesses a perpendicular magnetic recording medium, a read/write head and so forth, and performs reading/writing by the perpendicular magnetic recording system. The perpendicular magnetic recording system, unlike the conventional longitudinal recording system, forms magnetizations recorded in the thickness direction of a recording medium. In FIG. 14, a perpendicular magnetic recording medium 10 includes a recording layer 101 having the magnetic anisotropy in the thickness direction. The perpendicular magnetic recording medium 10 includes the following types: a single layer magnetic recording medium having this recording layer 101 only, and a multi layer perpendicular disk having a soft under layer 102 between the recording layer 101 and a substrate 103 (hereunder, the magnetic recording medium denotes the multi layer perpendicular disk, unless otherwise specified). The recording layer 101 is made of a perpendicular magnetic film having a high magnetic coercive force for retaining data, and the soft under layer 102 has the characteristic that produces magnetizations when a magnetic field d is applied thereto, but restores the non-magnetized state when the magnetic field is removed therefrom.

A read/write head 140 uses a read/write separate type that generally possesses a read head and a write head separately. The write head includes the following types: a ring head that has a gap on a ring-formed part also used in the longitudinal recording system, and performs writing by a magnetic field leaking from the gap, and an SPT (Single Pole Type) head that has a main pole and an return pole (hereunder, the write head denotes the SPT head, unless otherwise specified). For the read head is used a Magneto-resistive head 144 that can detect the variation of the field as the variation of the resistance (hereunder, called MR head).

Next, the write operation will be outlined with an example in which the SPT (Single Pole Type) head 140 and the multi layer perpendicular disk 10 are assembled. The main pole 141 is magnetized by a magnetic field generated by flowing a current through a coil 143 wound on the upper part of the write head. Since the area of the main pole end facing to the recording medium is very small, the magnetic fluxes are converged to generate a huge magnetic field right under the main pole, and thereby magnetizations are recorded in the recording layer 101. The magnetic field penetrating the recording layer 101 magnetizes the soft under layer 102. On the other hand, the return pole 142 is magnetized in the reverse direction to the main pole 141 by the magnetic field generated by the coil 143, but the area of the end of the return pole is large, and the magnetic field generated is too small to be recorded. However, since a magnetic field in the reverse direction to the main pole is generated in the soft under layer 102 right under the return pole 142, a magnetic field is formed which connects an area right under the main pole 141 and an area right under the return pole 142. In this case, the recording magnetic field is shown by a path 50 starting from the main pole 141 returning to the return pole 142 by way of the soft under layer 102.

As shown in FIG. 15, when a magnetic field 51 is applied perpendicularly to the face of such a recording medium from the outside, the magnetic field penetrates the main pole and the return pole. Now, since the main pole 141 converges a magnetic field on the end (511) of the magnetic pole because of its structure, there is a possibility of generating such an intense magnetic field as demagnetizing magnetizations recorded in the recording layer 101, even if the applied magnetic field 51 is low. This is a phenomenon called the demagnetization or degaussing of recorded magnetizations by the stray field. If this phenomenon occurs, the written information will be lost, and besides in a most remarkable case, even the servo mark and the track and sector identifying signal will be lost, which can be a hindrance to the operation itself as the disk drive (HDD).

The problems that appear when the stray field is applied perpendicularly to a recording medium have been known since. For example, JP-A No. 225901/1995 (patent document 1) and JP-A No. 225526/1993 (patent document 2) disclose the problems and the measures. The patent document 2 discloses a technique that installs a magnetic sensor in a device to thereby detect the magnetic field, and escapes the head outside the data area based on the detection. JP-A No. 100141/2002 (patent document 3) discloses a technique that detects the stray field by means of the read head, reads a pattern for detecting the stray field written on a recording medium by means of the read head, amplifies by a preamplifier using the conventional reading means, performs the A/D conversion, and then detects the stray field by using the average of the amplitude. JP-A No. 272331/2003 (patent document 4) discloses a technique that detects the stray field without flying the head above the magnetic recording medium. The technique according to the patent document 4 measures the resistances of the MR elements each in the state that the stray field is not applied, such as on production, and stores them in a FROM. This technique reads out the values of the FROM from the resistances of the MR elements and the ambient temperature during an actual operation by a temperature sensor, and thereby detects the stray field. It is also conceivable to add a magnetic shielding as the measure against the stray field. JP-A No. 77266/2003 (patent document 5) discloses a technique concerning the magnetic shielding.

BRIEF SUMMARY OF THE INVENTION

The technique according to the patent document 1 and the patent document 2 cannot correctly detect the field intensity at the position of the write head, and if the stray field applied is not unique in the perpendicular direction to the recording medium at the position of setting the sensor and at the head position, the technique incorrectly detects the stray field. This causes a performance loss by unnecessary escape, and if such a high stray field as the head should be escaped is applied, the head cannot be escaped, and the written signals are demagnetized or degaussed, which is the problem to be solved.

The technique according to the patent document 3 requires reading a specified pattern for detecting the stray field. Accordingly, the head flies above the magnetic recording medium during the detection, this performance is made in the state that the stray field is applied, and the recorded magnetizations of data signals and a servo mark are demagnetized or degaussed, which is the problem to be solved. In addition, this technique detects the signal from the read head after passing a preamplifier and a read channel; since an auto gain control circuit and a base line correction circuit are generally located at the pre-stage of the A/D converter of the read channel, and the detection is made in the state that the signal from the read head is corrected, the technique cannot correctly detect the influence by the stray field. Further, the preamplifier cannot sufficiently pass the direct current and low frequency components because these components are outside the pass band; therefore, this technique cannot achieve sufficient accuracy in detecting the stray field, which is the problem. Although the technique can detect the stay field when the field increases extremely sharply, it causes demagnetization or degaussing during the performance of the head escape, which is the problem to be solved.

The technique according to the patent document 4 cannot detect the magnetic field variation in the direct current components and the very low frequency components close to the direct current, which are outside of the pass band of the amplifier, by an amplifier incorporated in a conventional HDD, since the variation in the stray field intensity is very gentle against the magnetic field variation in the read signal. And, when there occurs a very steep magnetic field variation that the amplifier incorporated in the conventional HDD can detect, there is a possibility that causes demagnetization or degaussing during the performance of the head escape. The technique according to the patent document 5 requires shielding with a member made of a soft magnetic material having a thickness greater than a certain thickness in order to attain a sufficient effect of magnetic shielding; therefore, it is not necessarily possible to practically apply this technique especially to a mobile HDD in view of the restrictions of the weight and dimension. In addition, since a thorough magnetic shielding is impossible in general, a magnetic shielding will attenuate the intensity of the stray field to some extent, but it is impossible to completely shut out the stray field. Therefore, it is necessary to consider that a magnetic field is inevitably applied near the write head under the circumstances that the stray field exists.

In addition, in these techniques, the magnetic field applied increases with time, and if the increase rate of the field intensity is large, the magnetic field will exceed the field intensity that starts demagnetization during escape seek, thereby demagnetizing or degaussing the recorded magnetizations, which is the problem to be solved.

A feature of the present invention is to provide a reliable magnetic disk drive that prevents the demagnetization or degaussing of recorded magnetizations.

The magnetic disk drive according to an aspect of the present invention has the function that monitors the direct current components of the output from the read head, when the stray field is applied. In addition, it has the function that adaptively controls the field intensity at which the head starts the escape on the basis of the intensity variation in the stray field.

The output of the read head using an MR element is inputted to a preamplifier in the same manner as the conventional, and the normal read/write operation such as the positioning and data reading is carried out by way of a high pass filter (HPF) that attenuates low frequency components in order to suppress noises. In parallel to this, the output of the read head sends a signal to a stray field detecting module in order to detect the stray field through a direct current amplifier (DC Amp). Here, the DC Amp is an amplifier that amplifies the direct current components of the signal and the low frequency components close to the direct current. The stray field detecting module monitors the direct current components of the output from the read head, and at the moment that the level of the direct current components exceeds a certain threshold, the stray field detecting module escapes the write head from above the magnetic recording medium. The stray field detecting module adaptively controls the threshold for the escape operation on the basis of the variation in the direct current components of the output from the read head.

This makes it possible to prevent the write head from residing above the magnetic recording medium in the state that the stray field is applied, and to prevent the demagnetization or degaussing of recorded magnetizations. Moreover, to add a module that estimates the magnitude of the stray field on the basis of the variation in the direct current components of the output from the read head to the stray field detecting module as well as to escape the head on the basis of this estimation will make it possible to prevent the demagnetization or degaussing of recorded magnetizations, even in case there appears a sharp magnetic field variation.

According to the present invention, it is possible to correctly detect a stray field at the write head position in the circumstances that the stray field d is applied, to prevent the demagnetization or degaussing of recorded magnetizations, and to realize a highly reliable magnetic disk drive.

BRIEF DESCRIPTION OF THE DRAWINGS

FIG. 13 is a chart explaining a magnetic disk where the cylinder number is allocated in the ascending order from the inner periphery;

FIG. 14 is a chart explaining the perpendicular magnetic recording system; and

FIG. 15 is a chart illustrating a state in which the stray field is converged on the front end of a main pole.

DETAILED DESCRIPTION OF THE INVENTION

Figure 1:
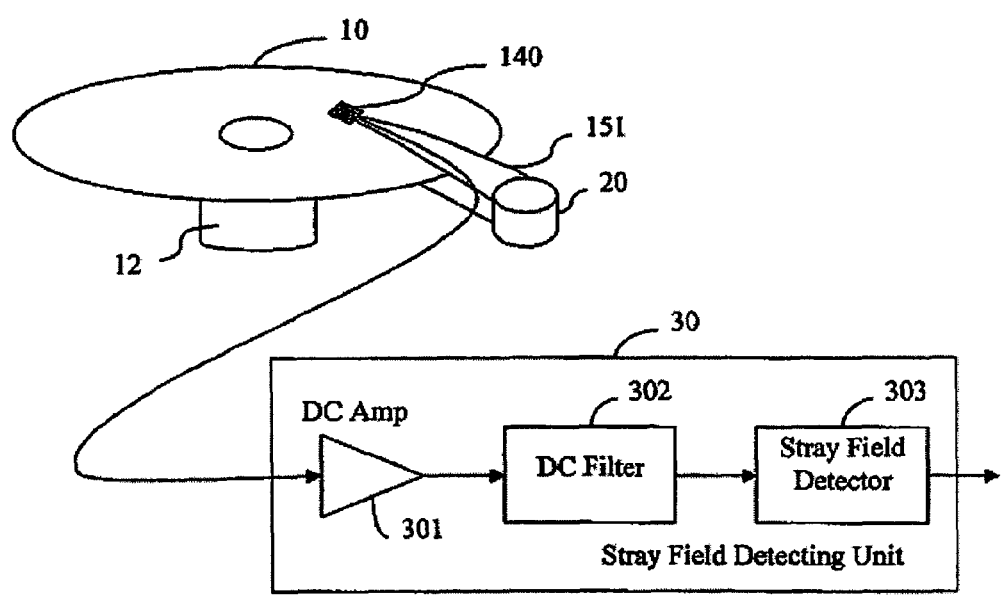
FIG. 1 is a chart illustrating a construction of a magnetic disk drive according to an embodiment of the present invention.

The embodiments of the present invention will be described with an application to a perpendicular magnetic disk drive. The stray field detecting method being the first embodiment of the present invention will be described with reference to FIG. 1 and FIG. 2. The magnetic disk drive as shown in FIG. 1 includes a magnetic recording medium 10 that is driven to rotate by a motor 12, a head 140 that performs reading/writing to the magnetic recording medium 10, and a stray field detecting unit 30. The magnetic recording medium 10 is a double-layer perpendicular recording medium that has a magnetic recording layer and a soft under layer. The head 140 includes a single pole type head having a main pole and a return pole as the write head, and an MR element using a magneto-resistive effect such as the giant magneto-resistive effect and the tunneling magneto-resistive effect as the read head. The head 140 is mounted on a slider on the front of a suspension 151, and is positioned at a desired track on the magnetic recording medium 10 by means of an actuator 20 such as a voice coil motor (VCM).

The signal read out from the magnetic recording medium 10 by using the MR element mounted on the head 140 is inputted to the stray field detecting unit 30. The output signal from the MR element is inputted to a direct current amplifier (DC Amp) 301. The DC Amp 301 amplifies the direct current and low frequency components of the signal, and a DC filter 302 passes only the direct current and low frequency components amplified. A stray field detector 303 calculates the stray field d intensity from the direct current and low frequency components amplified, and sends a stray field intensity signal to the outside of the stray field detecting unit 30.

Figure 2:
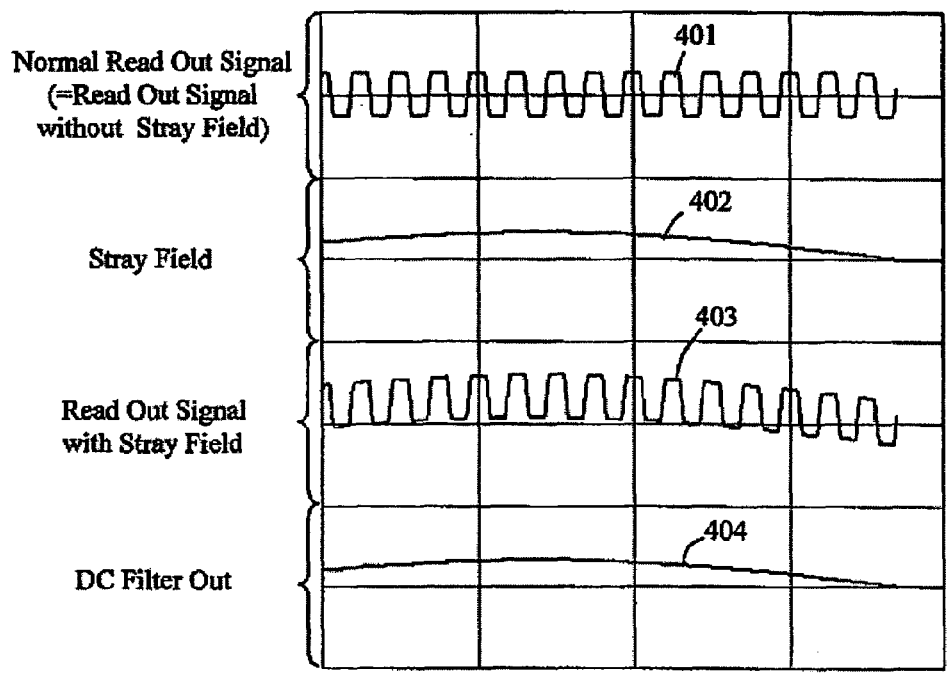
FIG. 2 is a chart illustrating the output of the MR element.

FIG. 2 illustrates the output from the MR element of the read head and the output of the DC Amp 301. When a stray field is not applied, the base line of an MR readout signal 401 read out from the magnetic recording medium by the MR element of the read head is constant. When a stray field 402 is applied, the stray field 402 distorts the MR readout signal, and the MR readout signal becomes an MR readout signal 403 affected by the stray field. To extract the low frequency components of this MR readout signal 403 by means of the DC filter 302 will make it possible to eliminate the recorded magnetization components in the MR readout signal, and to attain a DC filter output 404 composed of the stray field only.

Now, to pass the readout signal through an AGC or a base line correction circuit will make the base line of the MR readout signal constant as shown in the readout signal 401, even if the stray field 402 is applied. In contrast to this, according to this embodiment, since the readout signal is not corrected by means of the AGC or the base line correction function installed in the R/W IC as the conventional technique when the stray field is applied, the stray field intensity can correctly be detected by the stray field detecting unit 30.

Figure 3:
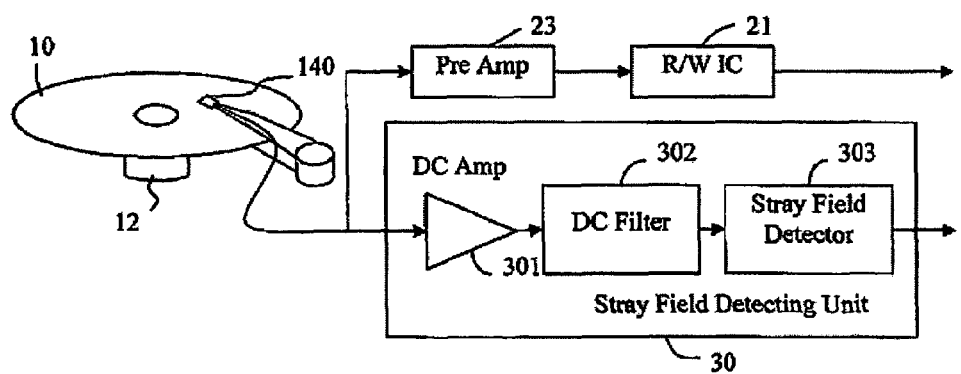
FIG. 3A is a chart illustrating a construction of a magnetic disk drive having a stray field detector.
FIG. 3B is a chart illustrating a construction of a magnetic disk drive having a stray field detector.
FIG. 3C is a chart illustrating a construction of a magnetic disk drive having a stray field detector.
Figure 3:
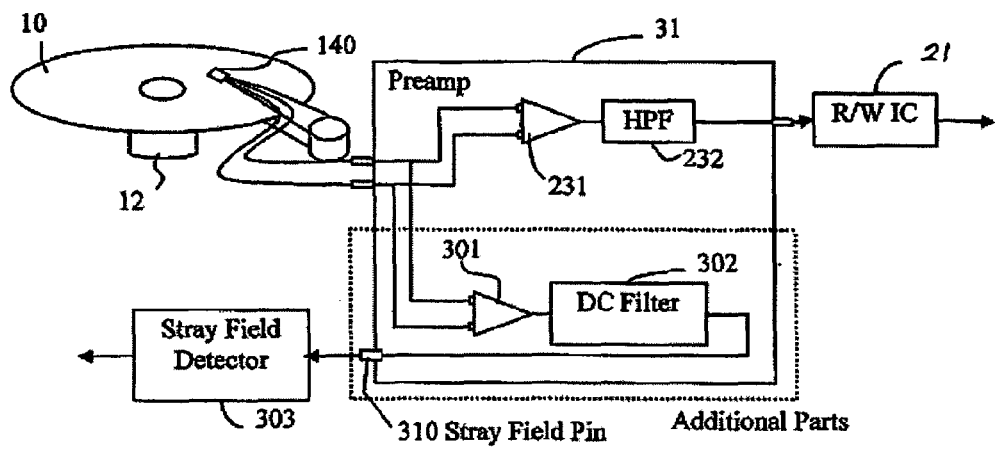
Figure 3:
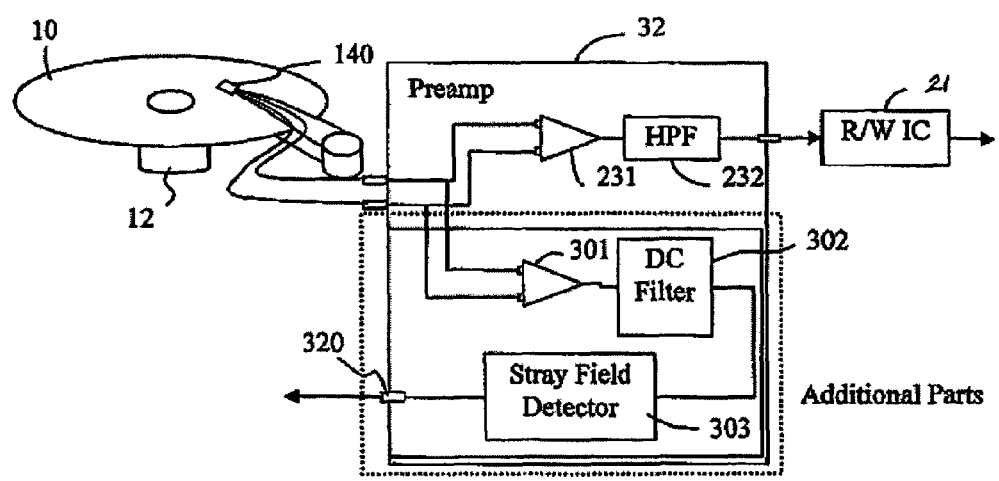

FIG. 3A trough FIG. 3C illustrate constructions of the magnetic disk drive including the stray field detector being the second embodiment of the present invention. FIG. 3A illustrates a construction that adds the stray field detecting unit 30 to the conventional signal processing circuit. The readout signal from the head 140 having the MR element is sent to a preamplifier 23 being the conventional signal processing circuit and an R/W IC 21, and so forth. In parallel to this, the readout signal from the head 140 is sent to the stray field detecting unit 30. Inside the stray field detecting unit 30, the output signal from the MR element is inputted to the DC Amp 301 in the same manner as the case with FIG. 1. The DC Amp 301 amplifies the signal containing the direct current and low frequency components, and the DC filter 302 passes only the amplified signal containing the direct current and low frequency components. The stray field detector 303 detects a stray field from this signal containing the direct current and low frequency components, and sends a stray field intensity signal to the outside of the stray field detecting unit 30.

FIG. 3B illustrates a construction that employs a preamplifier including a low frequency-components extracting module. The readout signal from the head 140 having the MR element is inputted to the preamplifier 31 including the low frequency-components extracting module. The signal inputted to the preamplifier 31 is sent to the R/W IC 21 outside, through a Read Amp 231 that amplifies the readout signal from the head and an HPF (high pass filter) 232 that eliminates noise components in the low frequency range. In parallel to this, the signal inputted to the preamplifier 31 is inputted through the DC Amp 301 contained in the preamplifier to the DC filter 302 that extracts the low frequency components. The preamplifier 31 includes a low frequency signal pin 310 to send an output of the DC filter 302 to the stray field detector outside the Preamplifier. Using the signal from this low frequency signal pin 310, the stray field detector 303 calculates the stray field intensity.

FIG. 3C illustrates a construction that contains all the functions of the stray field detecting unit in the preamplifier. Inside the preamplifier 32 including the stray field detecting unit, the output of the head is passed through the DC Amp 301 and the DC filter 302 for detecting the stray field, separately from the Read Amp 231 and HPF 232 for the readout. By passing the output signal from the DC filter through the stray field detector 303 contained in the preamplifier 32, the stray field detecting unit, when detecting a stray field, sends out a stray field intensity signal from a stray field signal pin 320.

According to these examples of the constructions, it is possible to configure a preamplifier including the stray field detector and the stray field detecting unit.

Next, the third embodiment relates the signal outputted from the stray field detector. The stray field detector 303 detects the stray field intensity from the output of the DC filter 302. The stray field detector 303 is able to output the detected stray field intensity as it is.

It is also possible to set in a memory a threshold determined in advance from the direct current and low frequency signal of the MR output in the state that the stray field is not applied, and when the stray field exceeds the threshold, to send out from the stray field detector 303 a signal showing that a critical stray field to cause demagnetization or degaussing is applied. It is possible to uniquely determine this threshold by the combination of the head and magnetic recording medium; however, since the resistance of the MR element varies depending on the temperature, it may be arranged to set several thresholds based on the relation between the temperature inside the drive, the operation time, and the most recent operation time, and to appropriately use some of the thresholds. This function is not necessarily contained in the stray field detector, and it may be contained in a region that receives the stray field intensity signal outputted from the stray field detector. According to this embodiment, the stray field detector is capable of detecting the stray field correctly, even if the temperature of the MR element varies depending on the ambient temperature and various operations of the head.

Figure 4:
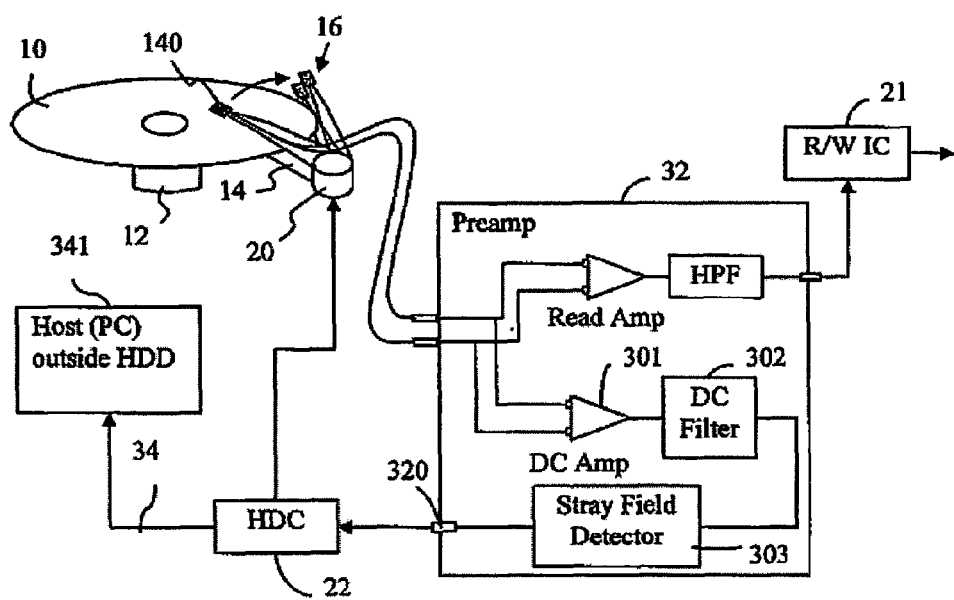
FIG. 4 is a chart illustrating a construction of a stray field resistant magnetic disk drive.

The forth embodiment relates a construction of a stray field resistant magnetic disk drive with reference to FIG. 4. The output of the head 140 is inputted to the preamplifier 32 including the stray field detecting unit. The preamplifier 32 including the stray field detecting unit detects the stray field, as already described with FIG. 3A through FIG. 3C. When the stray field is detected, the detected signal is sent to a HDC (Hard Disk Controller) 22 as the stray field signal through the stray field signal pin 320. When the stray field signal exceeds a preset threshold, the HDC 22 feeds into the VCM 20 a current in such a direction that the head 140 escapes from the magnetic recording medium 10, and drives the VCM 20 to escape an HSA (Head Stack Assembly) 14 at an unload position 16. According to this embodiment, even if the stray field is applied, it is possible to protect written information. It is also possible to prevent the situation that the servo mark and the track and sector identifying signal are lost to hinder the operation as the disk drive.

Figure 5:
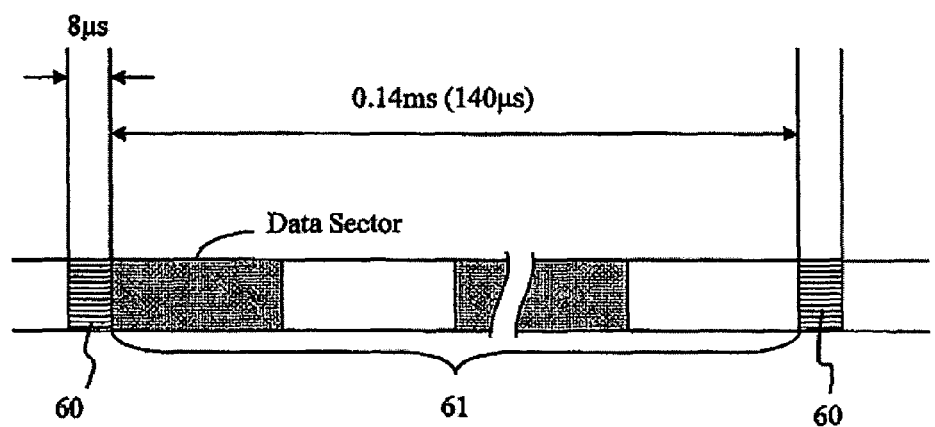
FIG. 5 is a chart explaining a method of detecting the stray field during the write operation.

The fifth embodiment relates a method of detecting the stray field during the write operation with reference to FIG. 5. The disk drive performs a seek operation to a target recording track while the drive writes information. The disk drive is in read of the servo mark and the track and sector identifying signal for positioning the head, during the seek operation. The disk drive reads this positioning signal (hereunder, called servo signal) 60, and detects the stray field at the same time. Most of the 2.5-type magnetic disk drive operates at the rotational frequency of 4200 rpm. Accompanied with the trend for a higher TPI, the servo signal 60 is written into 100 to 200 places per track. Assuming that the servo signal 60 resides at 100 places per track, the interval between the servo signals is 0.14 ms. The head escape time is estimated as about 10 ms from the average seek time of various disk drives available in the market, which is sufficient as the interval for detecting the stray field. Since one servo sector corresponds to about 20 bytes, which includes low frequency components such as a burst signal part, the sector is sufficient as a region for detecting the field. Since it is essential to read the servo signal at a constant interval even during the write operation, this embodiment can detect the stray field while detecting the servo signal 60.

Figure 6:
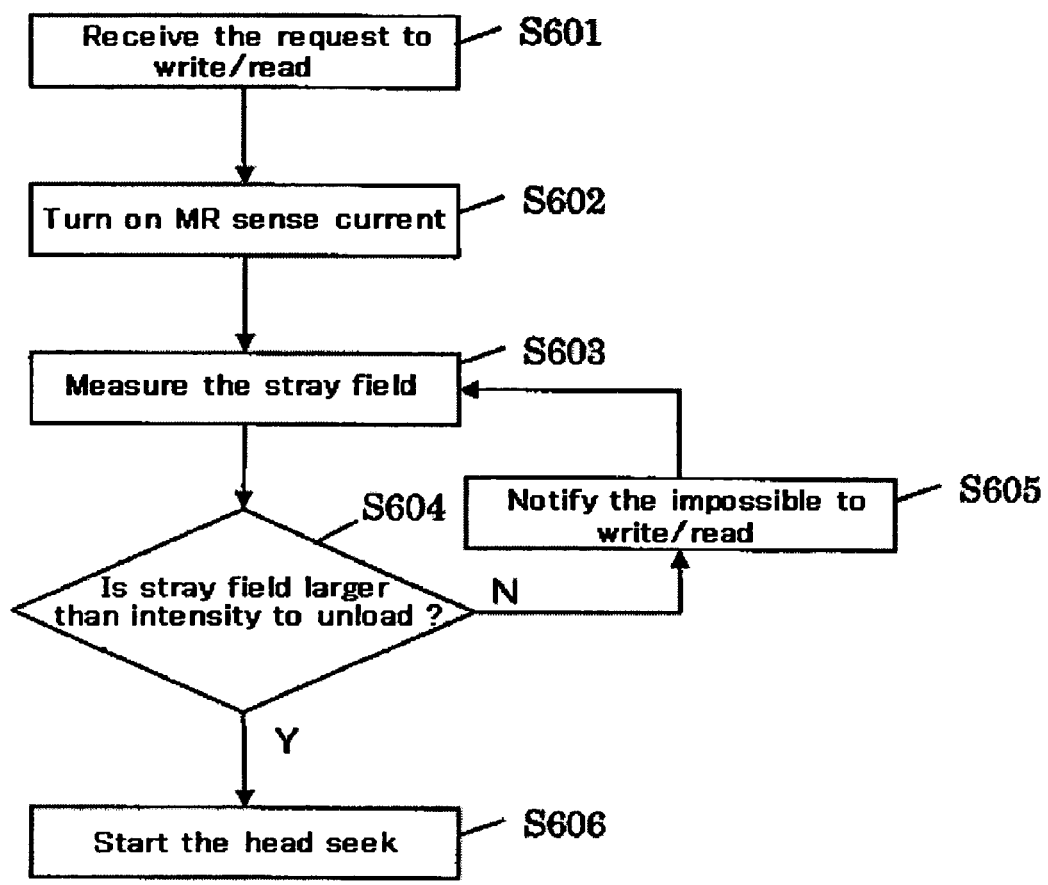
FIG. 6 is a flowchart illustrating a process of confirming the stray field before the read/write operation.

The sixth embodiment relates the process of confirming that there is not an apprehension that recorded magnetizations are demagnetized or degaussed by the stray field, thereafter operating the drive, with reference to FIG. 6. The step S601 receives the request to read/write from a host computer outside the HDD. At that moment, if the head resides on the magnetic recording medium, the drive continues the read/write operation. But if the drive is in the course of the start operation, or it is in the course of the restart operation after the head escape by the stray field, the step S602 feeds a sense current into the MR element before moving the head. The step S603 measures the stray field by the output of the MR element, and the step S604 judges whether it is the field intensity to escape or not. If the stray field is the field intensity to escape, the step continues to measure the stray field. At this moment, the step S605 may notify the outside of the drive that the read/write operation is impossible because of the stray field. If the stray field falls below the field intensity to escape in continuing the judgment of the stray field intensity, the step S606 feeds a current into the VCM and starts the positioning.

The step S605 notifies the outside of the drive that the read/write operation is impossible, a case of which will be explained with reference to FIG. 4. When a stray field is applied and the read/write operation is impossible, the HDC 22 transmits a start-disabling signal 34 to a host computer 341 such as a computer outside the drive. Thereby, the user of the computer is able to know that the reason the HDD does not perform the read/write operation is not because the HDD is in fault, but because the HDD protects data from the stray field. In this example, the HDC 22 is made to transmit the start-disabling signal 34; however, the R/W IC 21 or the preamplifier 32 or the like may be designed to transmit the signal.

Thus, while the stray field is applied, the drive will not move the head from the unload position above the magnetic recording medium. This embodiment prevents the seek operation in the state that the stray field is applied, and thereby protects written information. In addition, this embodiment correctly determines the time to finish the escape operation because of the stray field, and thereby reduces a useless escape time.

Figure 7:
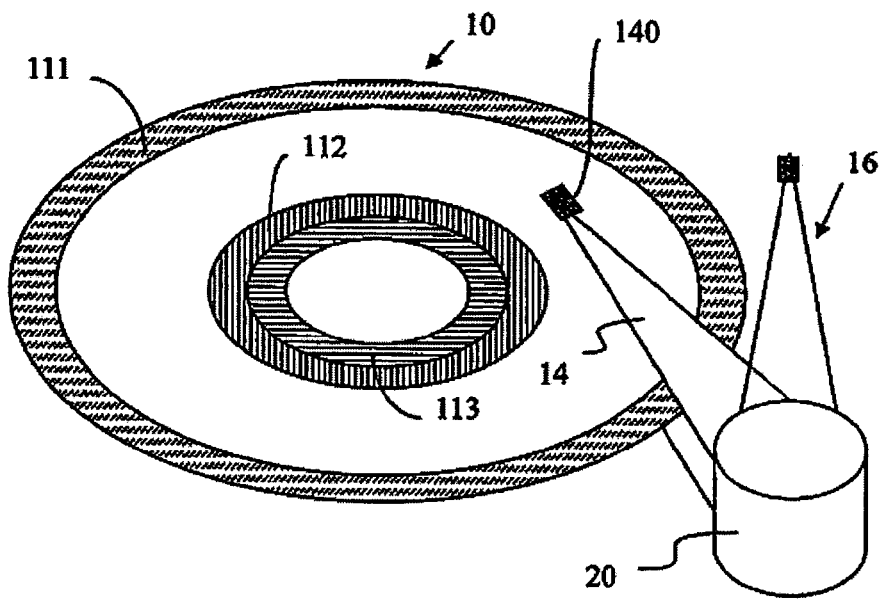
FIG. 7 is a chart explaining areas on the magnetic recording medium where the stray field resistant format is applied.

A construction of the magnetic recording medium being the seventh embodiment will be explained with reference to FIG. 7, in which an allocation area is set in the inside diameter of the disk. The magnetic recording medium 10 contains an allocation area 111 for controlling the information on the disk. The allocation area 111 generally resides on the outermost periphery of the disk. If the information in this area disappears, it will cause an obstacle in the operation of the drive. This embodiment writes the control information in an inner allocation area in inner diameter 113 on the side of the innermost diameter.

When the stray field is applied during the read/write operation, the stray field detecting method of this invention detects the stray field, and the head 140 comes in the escape operation. In the escape operation, the head 140 escapes from above the medium, across the outermost periphery of the magnetic recording medium 10. In this escape operation, while the head flies above the allocation area 111, the magnetic intensity reaches a level to cause demagnetization, which can demagnetize the allocation area 111. In this embodiment, the allocation area in inner diameter 113 is located on the inner diameter, and thereby the head does not need to fly above the allocation area 111. While the allocation area is desirably located on the outer diameter because of the performance of the drive or the like, the second allocation area is located on the inner diameter, and thereby if the allocation area 111 on the outer diameter had damage, the allocation area 111 on the outer diameter can be restored by using the information written in the allocation area in inner diameter 113 on the inner diameter.

This embodiment prevents demagnetization in the allocation area by the stray field, since the head does not fly above the allocation area during the escape operation. Even if the stray field damages the control information in the allocation area on the outer diameter, the two allocation areas located on the inner and outer diameters can restore and operate the drive normally.

A construction as the eighth embodiment, in which the escape area is located on the inner periphery, will be explained with reference to FIG. 7. This embodiment locates a head escape area 112 on the side of the innermost periphery of the magnetic recording medium 10. Further, this embodiment is provided with a buffer for retaining the relation between the escape time from the position of the head 140 to the unload position 16 and the escape time from the position of the head 140 to the escape area 112. This escape area 112 can be shared with the allocation area in inner diameter 113 on the inner periphery. Here, as shown in FIG. 7, the escape area 112 is located outside the allocation area in inner diameter 113 on the inner periphery.

This embodiment escapes the head 140 to the position being shortest in the escape time from the current position, of the unload position 16 on the outside of the disk and the escape area 112 on the inner periphery, while the stray field applied during the read/write operation reaches the level to escape the head 140. Here, the position of the head and the direction of the head escape are stored, whereby the position to which the head flied when the stray field is applied can be specified. Accordingly, in the case of a drive that can record the servo signal only by the head of the drive of its own, the drive can restore the servo signal even if the servo signal is demagnetized or degaussed because of the head flying.

According to this embodiment, it is possible to make shortest the escape time from the current position of the head, and to reduce the probability of demagnetization or degaussing during the head escape. In the case of a drive that can record the servo signal only by the head of the drive of its own, it is possible to restore the servo signal demagnetized.

According to the above embodiments, it is possible to detect the stray field correctly at the position of the write head in the situation that the stray field is applied, and to prevent the demagnetization or degaussing of recorded magnetizations.

Figure 8:
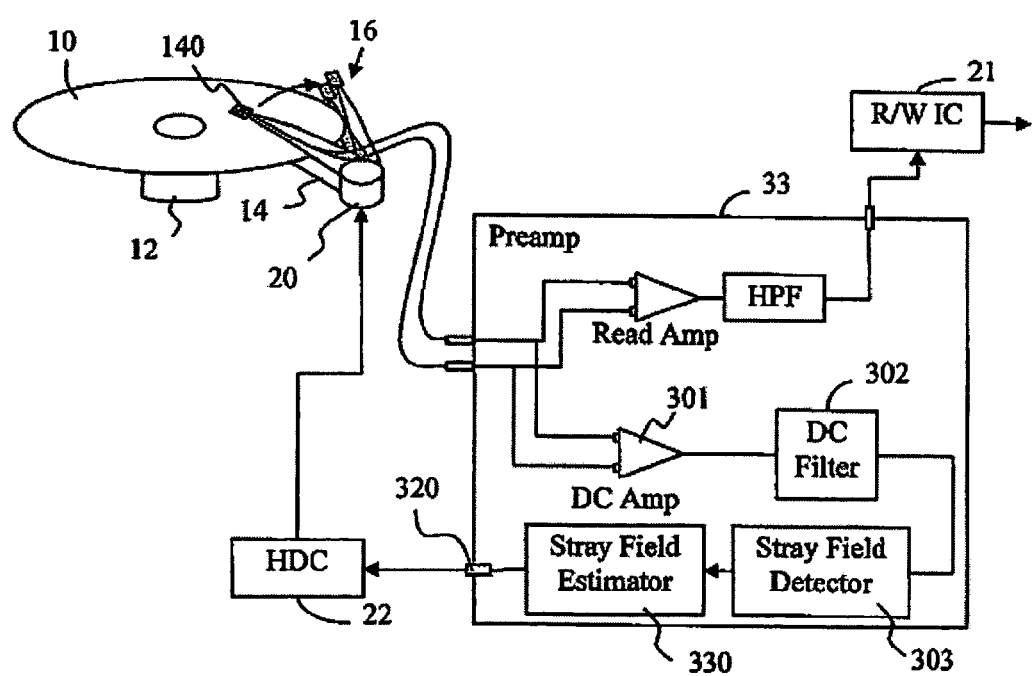
FIG. 8 is a chart illustrating a construction of a magnetic disk drive having a stray field estimating module.
Figure 9:
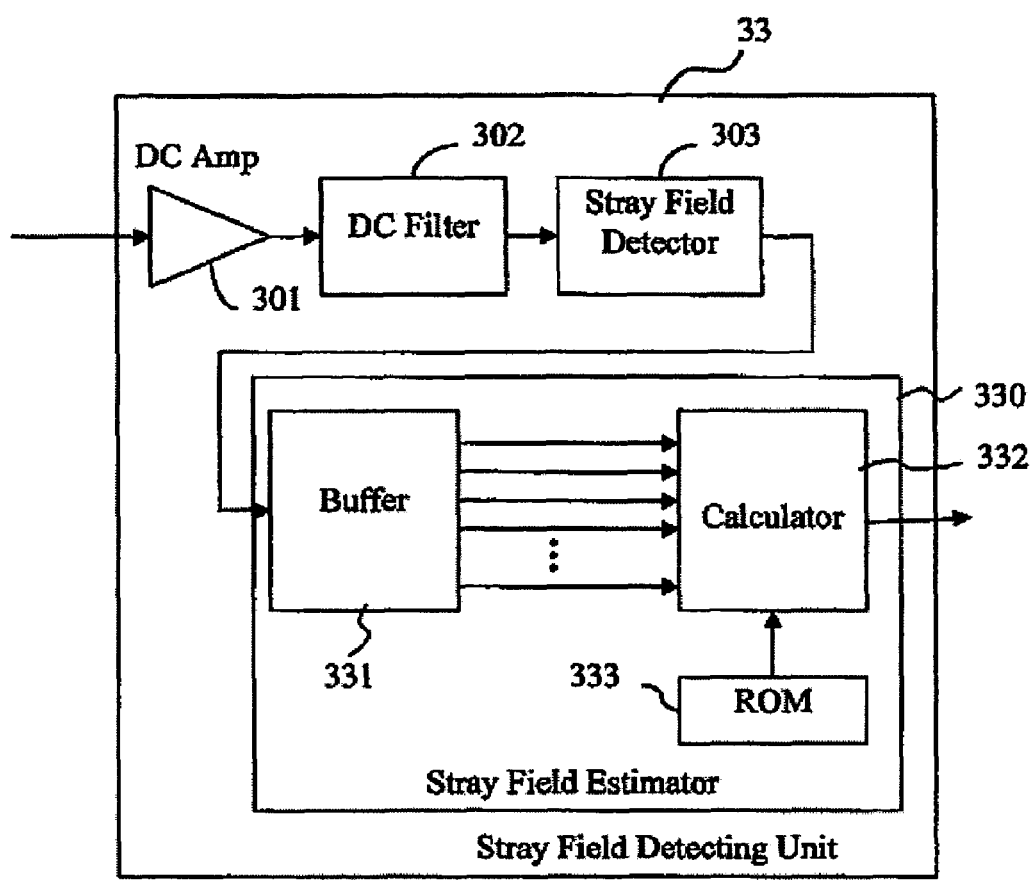
FIG. 9 is a chart illustrating a construction of the stray field d estimating module.

The ninth embodiment relates a stray field detecting unit having an estimating module with reference to FIG. 8 and FIG. 9.

A stray field detection unit 33 having a stray field estimating module sends a stray field intensity to a stray field estimation circuit 330 from the stray field detector 303, according to the process as shown in the first embodiment. The stray field estimation circuit 330 includes a buffer memory 331 that retains the stray field intensity and a calculation circuit 332 that outputs an estimated value. The buffer memory 331 retains the stray field intensities measured several times in the past. The stray field estimation circuit 330 estimates the stray field intensity by using an estimation formula contained in the calculation circuit 332. The timing of estimating the stray field intensity is a time in the future from the present moment by a time required for the stray field countermeasure. The estimation formula employs the prediction by the linear extrapolation and higher-order differential coefficients. The details will be explained with FIG. 11 and FIG. 12.

Figure 10:
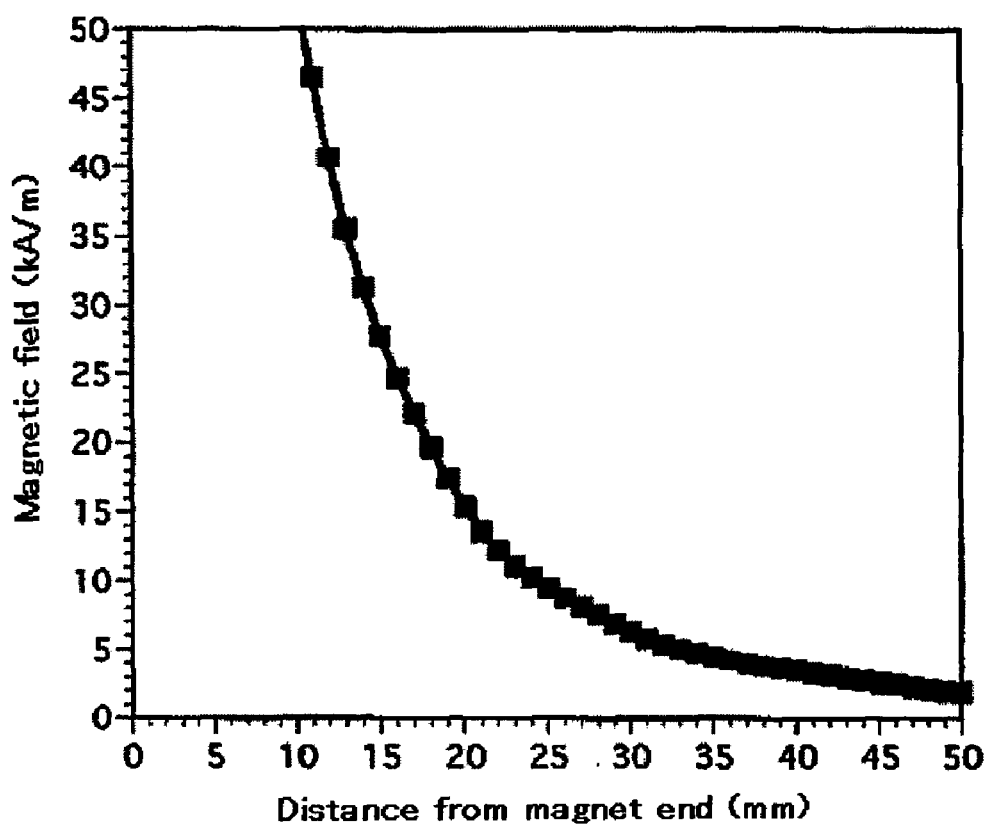
FIG. 10 is a chart illustrating a measurement of a magnetic field intensity near a magnet.

FIG. 10 illustrates an emanating magnetic field intensity near a square pole permanent magnet whose length is 20 mm, section is 11 mm square, and residual magnetic flux density is 0.43 T, which was actually measured by using a gauss meter. The measurement was made using the distance from the bottom of the square pole directly above the center of the bottom thereof as the parameter. The measurement result shows that if the head is approximated within 30 mm to the end face of the magnet, the magnetic field will reach the critical magnetic field magnetic strength, namely, the field intensity under which the HDD becomes inoperative (due to fatal damage). Therefore, under the situation where the magnetic field is applied completely statically and perpendicularly to the face of the recording medium, to approximate the head nearer than the above will involve a possibility of generating fatal demagnetization.

The degree of influence by the field intensity is estimated from the measurement result of the field intensity surrounding the magnet, as shown in FIG. 10. The following conditions are set forth as a premise: the magnetic field is applied perpendicularly to the face of the recording medium, the center of the bottom of the magnet comes directly above the head, and the magnet is approximated at the speed of 1 m/s, starting at the position of 70 mm from the face of the recording medium. Here, the approximating speed of 1 m/s comes from the assumption that the average walking speed of people or the average moving speed of portable devices by human hands is about 1 m/s.

Figure 11:
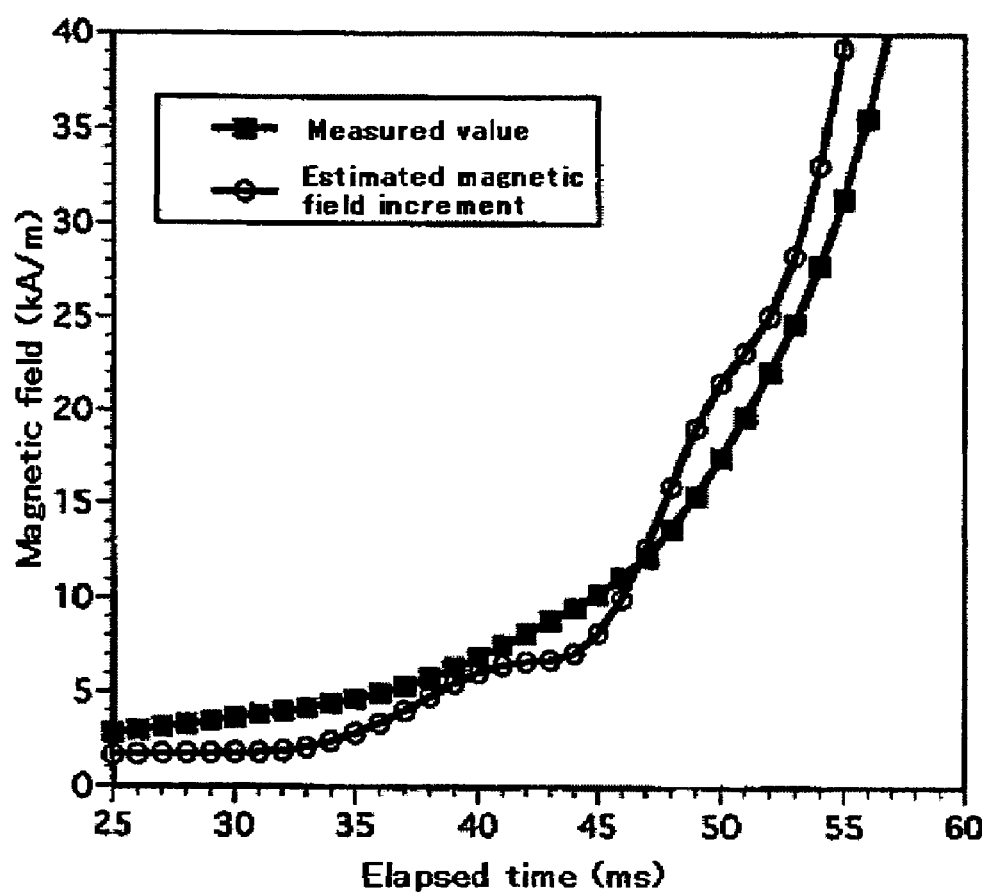
FIG. 11 is a chart illustrating a variation with time of a magnetic field when approaching to the magnet.

FIG. 11 illustrates the field intensity with the elapsed time from the start of approximation, calculated on this premise. This graph shows that the magnetic field exceeds the critical magnetic field strength at 40 ms from the start of approximation. Assuming that the limit field strength for starting to escape the head is set to the critical magnetic field strength, and the time required for escaping the head is 10 ms, the graph shows that the magnetic field intensity applied immediately before finishing the head escape, that is, at 50 ms from the start of approximation reaches an extremely high value of 17.5 kA/m. There is a high possibility that to apply such a high field intensity will create an obstacle to the operation as the drive. This shows a necessity for taking the time required for escaping the head into consideration, and a necessity for setting the limit field strength for starting to escape the head sufficiently lower than the value where fatal demagnetization starts. The reason that the time required for escaping the head is specified as 10 ms lies in that the average seek time of many 2.5-type magnetic disk drives used mainly in the portable devices being available in the market nowadays is about 10 ms.

To explain this with the above example, assuming that it was possible to completely know the increment of the magnetic field in advance, to start the head escape at 30 ms from the start of approximation at the time of the magnetic field intensity 3.5 kA/m would have made it possible to avoid fatal demagnetization over the whole escape seek period. However, the actual magnetic field variation near the magnet can be presumed innumerably depending on the saturation flux density and shape of the magnet, and the path and speed during approximation; therefore, to know the increment of magnetic field in advance is substantially impossible. Accordingly, it is conceivable as conventional in an actual design to suppose the maximum increment and determine the limit in accordance with it. However in this design technique, to estimate the increment of the field intensity within the escape seek time higher will inevitably lead to setting the limit lower, which results in increasing the frequency of the head stopping in response to a weak magnetic field. The operation of sensing the stray field and escaping the head is for avoiding an emergency that is intended intrinsically to prevent the drive from damages and to secure recorded data, and frequent occurrences of this operation more than necessary is not desirable. On the contrary, to set the limit higher will increase a possibility of producing the area where the disk is subjected to fatal demagnetization within the escape seek time.

This embodiment solves the above problem by adding the module that estimates the variation of the field intensity. According to this embodiment, it is possible to perform the countermeasure operation for the stray field such as the head escaping operation, leaving the time for performing the countermeasure operation for the stray field.

FIG. 8 and FIG. 9 illustrate the most basic construction of this embodiment. The stray field detector 303 detects the magnetic field intensity from the output of the DC Amp 301, and digitizes the value to send it to the buffer memory 331. The buffer memory 331 employs a first-in first-out (FIFO) memory, which retains the past values of the stray field intensity in a certain time. The read-only memory (storage unit) 333 stores the critical magnetic field strengths and so forth, and the constants necessary for judging to or not to escape the head, etc. The stray field estimation circuit 330 estimates the magnetic field intensity within the escape seek time on the basis of these values and the most recent past magnetic field intensity in the buffer memory 331, while using the calculation circuit 332; if the estimated value is judged to exceed the critical magnetic field strength within the escape seek time, the stray field estimation circuit 330 sends to VCM 20 the instruction to immediately break the operation regardless of whether the drive is in the write or read operation at that time and escape the head 140, and drives the VCM 20 to escape the head from the data area. The time required for escaping the head differs depending on the head positions at different times. It is reasonable to use the maximum value of the time required for escaping in estimating the field intensity, if the reliability is regarded as important. Since this embodiment adopts the design technique whereby the head escape is hard to occur as far as circumstances allow, the stray field estimation circuit 330 inputs the head position information acquired from the VCM 20 to the calculation circuit 332, and in consideration for this, performs the estimation of the field intensity and the judgment as to escape the head or not.

Figure 12:
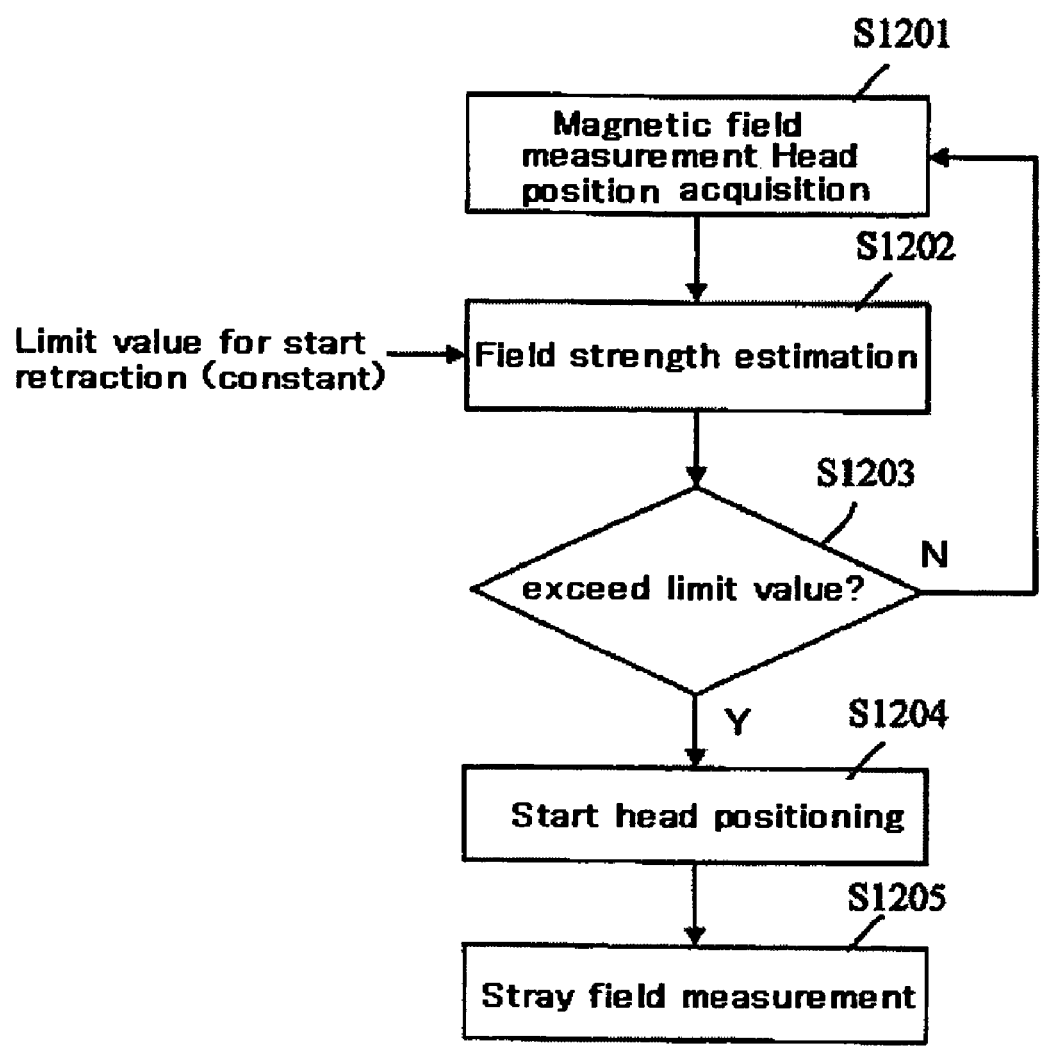
FIG. 12 is a flowchart illustrating a process of measuring the stray field and escaping the head.
Figure 1:
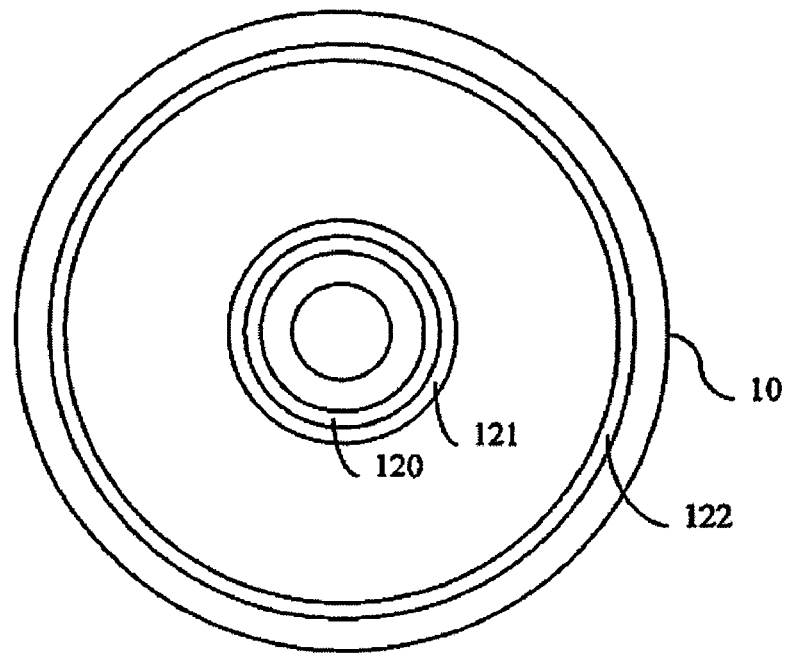
Figure 1:
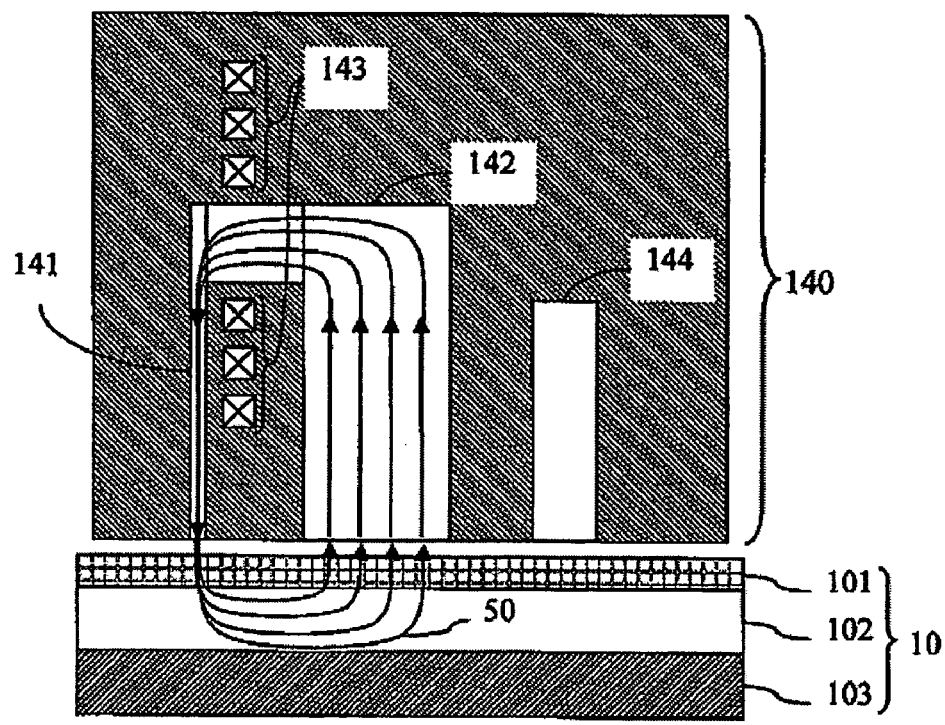

FIG. 12 shows a series of operation processes mentioned above. The step S1201 measures the field intensity at the head position with the stray field detector 303, and acquires the head position information from the VCM 20 at the same time. The step S1202 estimates the field intensity at the time when the head finishes escaping on the assumption that the head is made to escape immediately from the variation of the most recent past stray field intensity, that is, at the time when the head is estimated to reach the head escaping area. The step S1203 judges whether the estimated field intensity exceeds the limit for starting the escape; if it does not, the process returns to the magnetic field measurement at the current head position If the estimated field intensity exceeds the limit for starting the escape, the step S1204 starts the head escaping operation, and the step S1205 measures the stray field intensity. When the stray field d intensity is confirmed as being lowered, the head escaping is halted and the normal operation is resumed.

In FIG. 9, the buffer memory, calculation circuit, and read-only memory are denoted as individual devices, however all or part of these can be combined, for example, into an integrated circuit or the like that controls the whole operation of the drive, which is well understood by a person having ordinary skill in the art. It is natural that the signal flows should not necessarily coincide with those shown in FIG. 8 and FIG. 9 depending on the design of the integrated circuit, which is the same. In the above description, for example, the head position information is acquired from the VCM 20; however, it is conceivable to judge this from the track (cylinder) number that is read immediately before, and in this case, the head position information is to be acquired from the channel system. Further, the calculation circuit is not necessarily implemented with an individual hardware, but it can be implemented with a general-purpose digital signal processor or with a microprocessor and software.

The algorithm to predict the variation of the field intensity from the most recent field intensity can adopt the linear extrapolation. This method calculates the varying rate with time of the stray field intensity by means of the numerical differentiation, and predicts the field intensity at the time of finishing the escape by using the formula (1). Here, H(t) is the magnetic field, $\Delta t$ is the sampling interval time in the measurement, and n is the quotient by $\Delta t$ of the escape seek time.

[Formula 1]

$$H(t_0+n\Delta t)=H(t_0-\Delta t)+n\{H(t_0-\Delta t)-H(t_0)\} \quad (1)$$

The superiority of this method will be explained with the measured magnetic field as shown above. FIG. 11 shows the time variation of the magnetic field calculated from the measured magnetic field as well as the estimated increment of the field intensity calculated from the varying rate with time of the field intensity calculated by the numerical differentiation. The time required for escaping the head is assumed as 10 ms, which is the same as the well-known example. The time when the magnetic field is estimated to reach the critical magnetic field strength at the time of finishing the escape was calculated by using the formula (1), and the result was that the estimated time was at 33 ms from the start of approximation and the field intensity at that time was 4.2 kA/m. Although this result shows that the estimated time is delayed by 3 ms compared to the case in which the variation with time of the magnetic field could completely be estimated, it also shows that the number of the tracks to which the magnetic field higher than the critical magnetic field strength is applied on the way of escaping is reduced by about 70%, compared to the case in which the estimation is not performed. There still remain the tracks to which the magnetic field higher than the critical magnetic field strength is applied, which results from that the magnetic field can be estimated only approximately; especially as in this example, in the case where the varying rate of the magnetic field increases sharply with the elapsed time, the magnetic field at the time of finishing the escape is likely to be estimated lower. In the case where the varying rate decreases on the way, this problem is hard to occur. To solve this problem is to enhance the estimation accuracy of the field intensity. For example, it is conceivable to add the second derivative of the field intensity to the estimation of the variation of field intensity.

Next, a case will be considered, where the same magnet is approximated at double the speed (2 m/s). In this case, naturally, the increasing rate with time of the magnetic field is double the case of approximating at 1 m/s. In this case, in the same manner as the above example, the time of starting the escape in which this embodiment is applied and the field intensity on the way of the escape will be evaluated; the time when the stray field intensity is judged to exceed the critical magnetic field strength is at 13 ms from the start of approximation, and the field intensity at that time is 2.9 kA/m. The time when the stray field intensity exceeds the critical magnetic field strength is at 20 ms from the start of approximation. Therefore, the field intensity exceeding the critical magnetic field strength is to be applied during the latter half 3 ms of the escape seek time. If the varying rate of the stray field intensity becomes doubled, the timing of starting the head escape is automatically selected in compliance with the variation, and as a result, the time during which the disk is exposed with the magnetic field higher than the critical magnetic field strength is controlled to the same level as the case where the magnet is approximated at 1 m/s. This result cannot be achieved by a simple threshold control.

As mentioned above, it is advantageous to make the time required for the head escape shorter. To be subjected to the stray field and to escape the head is a measure of an emergency evacuation, which is considered not to occur frequently continuously. Therefore, it is effective to shorten the escape time while escaping the head, by speeding up the seek time than usual. In the case of the rotary actuator using the electromagnetic mechanism such as the VCM, to increase the seek speed can easily be achieved by increasing the current to be fed into the coil.

The method in the above description separates the stray field from the head output. However, it is well accepted to provide a stray field sensor separately from the head and use the output of the sensor. As the stray field sensor can be used a well-known Hall device or a GMR device. The sensor should be located as near the head as possible. In consideration for the easiness of mounting, it is recommended to locate the sensor on the side of the recording medium, or to locate it on the control substrate along the seek path of the head. Or it may be embedded in the enclosure 12. Or it may be located on the head suspension, or it may be integrated on the head.

The tenth embodiment relates a construction with reference to FIG. 13, in which the cylinder number is allocated in the ascending order from inside toward outside.

The cylinder number is allocated in the ascending order conventionally with the outermost cylinder of the data area as the number zero toward the inside. The number of the cylinder differs depending on the designs of individual devices, and the information necessary for the operation related to defect information and so forth is necessarily to be recorded in the cylinder of young number, that is, to be recorded on the outermost periphery of the magnetic recording medium. And for the same reason, the device including the drive often records the basic information in the cylinder on the outer periphery. In short, important information is often recorded on the outer periphery. On the other hand, most of small magnetic disk drives available in the market nowadays adopt the mechanism that withdraws the head from the surface of the magnetic recording medium while the drive is in halt, in order to prevent the absorption between the head slider surface and the surface of the magnetic recording medium. The mechanism that approaches the head to the surface of the magnetic recording medium and withdraws the head from the surface thereof is usually provided near the outermost periphery of the medium; therefore, it is natural to escape the head toward the outer periphery. However, as mentioned above, when the varying rate of the magnetic field increases sharply with the elapsed time, there is a high possibility that the field intensity exceeds the critical magnetic field strength immediately before finishing the escape. In other words, the field intensity exceeds the critical magnetic field strength while the head during the escape passes the allocation area on the outermost diameter of the medium, which leads to a great danger that demagnetizes the important information recorded in the allocation area.

In order to avoid the demagnetization of the important allocation area and so forth, it is conceivable to provide an escape area on the inner periphery to the innermost periphery of the data area, and to escape the head in this escape area for the head escape due to the stray field. However, this method cannot stop the rotation of the medium because of preventing the absorption between the surface of the head slider and the surface of the medium, that is, this method involves a problem that the power cannot be turned off, or the motor cannot be halted for saving the power.

Accordingly, as shown in FIG. 13, the cylinder number is arranged in the ascending order toward the outer periphery during the physical formatting, such that the number 0 is assigned to the cylinder 120 on the innermost periphery, the number 1 is assigned to the cylinder 121 on the second outside, and the number (N-1) is assigned to the cylinder 122 on the outermost periphery. Setting the direction of escaping the head to the outside will reduce the possibility that the allocation area is subjected to fatal demagnetization.

According to the embodiments thus described, even in a situation that the magnetic field can generate a steep variation, it is possible to prevent the demagnetization or degaussing of recorded magnetizations, by adding the stray field estimating module to estimate the variation of the field intensity, and performing the head escape at an appropriate timing.

The present invention is not limited to the above embodiments, and it should be well understood that various modifications and changes are possible without a departure from the spirit and scope of the invention. For example, part of the stray field detecting unit is included in the preamplifier, which includes the stray field detector in the above description; however, the HDC may include the same function as the stray field detector. And, the stray field detector is designed to send the stray field intensity signal; however, it may be arranged that the stray field detector sends only the distortion by the stray field, and the HDC calculates the intensity. Further, a stray field sensor may be provided separately from the head in order to detect the stray field.

As a combination of the magnetic recording medium and the write head, the above embodiments mainly cite the combination of the single pole head and the perpendicular double layer medium; however, the present invention is effective against the influence by the stray field, in any combinations of the single pole head and the single layer medium, the ring type head and the perpendicular double layer medium, and the ring type head and the single layer medium, which covers substantially the whole perpendicular recording system.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A stray field detecting unit in a magnetic disk drive comprising:
   a low frequency-components extracting module that inputs an output of a read head including a magneto-resistive effect element, and extracts low frequency components from the output, the low frequency-components extracting module including a DC amplifier and a band limiter having a band-pass characteristic that passes a direct current and a low frequency range; and
   a stray field detector that detects a stray field from the extracted low frequency components.

2. The stray field detector according to claim 1, wherein the stray field detector outputs a signal when detecting that the stray field exceeds a predetermined threshold.

3. A magnetic disk drive comprising:
   a magnetic recording medium;
   a head mounted with a write head and a read head including a magneto-resistive effect element;
   a spindle motor that drives the magnetic recording medium;

a head driving unit that drives the head relatively to the magnetic recording medium; and a signal processing unit that processes an output of the read head, wherein the signal processing unit includes a low frequency-components extracting module that extracts low frequency components from the output of the read head, and a stray field detector that detects a stray field from the extracted low frequency components, wherein the low frequency-components extracting module includes a DC amplifier and a band limiter having a band-pass characteristic that passes a direct current and a low frequency range, and wherein when the stray field detector detects the stray field of a predetermined magnitude, the head driving unit drives the head to a head escape area.

4. The magnetic disk drive according to claim 3, wherein the stray field detector outputs a signal when detecting that the stray field exceeds a predetermined threshold.

5. The magnetic disk drive according to claim 3, wherein, before moving the head from the escape area to above the magnetic recording medium, the stray field detector detects the stray field.

6. The magnetic disk drive according to claim 3, wherein, when the stray field detector detects the stray field of the predetermined magnitude and the head driving unit drives the head to the head escape area, a host outside HDD is notified that the stray field is applied.

7. The magnetic disk drive according to claim 3, wherein an allocation area is located on an inner diameter of the magnetic recording medium.

8. The magnetic disk drive according to claim 3, wherein allocation areas are located on the inner diameter and an outer periphery of the magnetic recording medium.

9. The magnetic disk drive according to claim 3, wherein the head escape area is provided on a side of the inner periphery of the magnetic recording medium.

10. The magnetic disk drive according to claim 3, wherein the magnetic recording medium has an allocation area on the inner diameter thereof, and the head escape area is provided on the outside of the allocation area.

11. The magnetic disk drive according to claim 3, further comprising a plurality of head escape areas, wherein, when the head is driven to a head escape area, the head is driven to one of the head escape areas, to which the head can move in a shorter time from a head position at the time.

12. The magnetic disk drive according to claim 3, wherein the magnetic recording medium is a multi layer perpendicular recording disk having a recording layer and a soft under layer, and the write head is a single pole type head having a main pole and a return pole.

13. A stray field detecting unit in a magnetic disk drive comprising:
a low frequency-components extracting module that inputs an output of a read head including a magneto-resistive effect element, and extracts low frequency components from the output;
a stray field detector that detects a stray field from the extracted low frequency components; and
an estimator that estimates an intensity variation of the stray field, the estimator including a storage unit that stores information on the stray field detected in the past by the stray field detector, and a calculator that estimates the intensity variation of the stray field on the basis of the information stored in the storage unit.

14. A magnetic disk drive comprising:
a magnetic recording medium;
a head mounted with a write head and a read head including a magneto-resistive effect element;
a spindle motor that drives the magnetic recording medium;
a head driving unit that drives the head relatively to the magnetic recording medium; and
a signal processing unit that processes an output of the read head,
wherein the signal processing unit includes a low frequency-components extracting module that extracts low frequency components from the output of the read head, a stray field detector that detects a stray field from the extracted low frequency components, and an estimator that estimates an intensity variation of the stray field, wherein the estimator includes a storage unit that stores information on the stray field detected in the past by the stray field detector, and a calculator that estimates the intensity variation of the stray field on the basis of the information stored in the storage unit, and
wherein when the estimator estimates that the stray field reaches a predetermined magnitude, the head driving unit drives the head to a head escape area.

15. The magnetic disk drive according to claim 14, wherein, when the head is driven in assumption to the head escape area from a current position, the estimator estimates the field intensity when the head arrives at the head escape area.

16. The magnetic disk drive according to claim 14, wherein, when the estimator estimates that the stray field reaches the predetermined magnitude and the head driving unit drives the head to the head escape area, the head driving unit drives the head at a higher speed than a normal seek speed.

17. The magnetic disk drive according to claim 14, wherein the magnetic recording medium has cylinder numbers allocated in the ascending order toward the outside with the inner periphery as a cylinder number 0.

18. The magnetic disk drive according to claim 14, wherein, when the estimator estimates that the stray field reaches the predetermined magnitude and the head driving unit drives the head to the head escape area, the head driving unit drives the head to a direction in which the cylinder number increases.

19. The magnetic disk drive according to claim 14, wherein the magnetic recording medium is a multi layer perpendicular recording disk having a recording layer and a soft under layer, and the write head is a single pole type head having a main pole and a return pole.

20. A method of escaping a head in a magnetic disk drive, comprising:
extracting, by use of a DC amplifier and a band limiter having a band-pass characteristic that passes a direct current and a low frequency range, low frequency components from an output of a read head including a magneto-resistive effect element;
detecting a stray field from the extracted low frequency components;
determining whether or not an intensity of the detected stray field is equal to or higher than a predetermined value; and
escaping the head to a head escape area, when it is determined that the intensity is equal to or higher than the predetermined value.

21. A method of escaping a head in a magnetic disk drive, comprising:
extracting low frequency components from an output of a read head including a magneto-resistive effect element;

detecting a stray field from the extracted low frequency components;

estimating an intensity variation of the stray field, wherein estimating the intensity variation of the stray field comprises calculating a future intensity of the stray field on the basis of information on the stray field detected in the past;

determining whether or not an intensity of the estimated stray field is equal to or higher than a predetermined value; and escaping the head to a head escape area, when it is determined that the intensity is equal to or higher than the predetermined value.

22. A method of escaping a head in a magnetic disk drive according to claim 21, wherein, when the head is driven in assumption to the head escape area from a current position, estimating an intensity variation of the stray field estimates the field intensity when the head arrives at the head escape area.

23. A perpendicular magnetic disk drive comprising:

means for detecting a stray field in the perpendicular magnetic disk drive;

means for estimating an intensity variation of the stray field; and means for escaping a head in the perpendicular magnetic disk drive based on the estimated intensity variation of the stray field.

* * * * *